(12) United States Patent
Bezama et al.

(10) Patent No.: US 6,745,932 B2
(45) Date of Patent: Jun. 8, 2004

(54) LOW STRAIN CHIP REMOVAL APPARATUS

(75) Inventors: Raschid J. Bezama, Mahopac, NY (US); Govindarajan Natarajan, Pleasant Valley, NY (US); Robert W. Pasco, Wappingers Falls, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 10/235,008

(22) Filed: Sep. 3, 2002

(65) Prior Publication Data

US 2004/0041012 A1 Mar. 4, 2004

(51) Int. Cl.⁷ .............................................. B23K 1/018
(52) U.S. Cl. ........................... 228/191; 228/13; 228/264
(58) Field of Search ................................. 228/119, 191, 228/264, 13, 19–23

(56) References Cited

U.S. PATENT DOCUMENTS

| | | | | |
|---|---|---|---|---|
| 3,748,719 A | * | 7/1973 | Fuller et al. | 228/125 |
| 3,800,996 A | * | 4/1974 | Fuller et al. | 228/2.3 |
| 4,202,482 A | * | 5/1980 | Sade et al. | 228/4.5 |
| 4,561,584 A | | 12/1985 | Hug | |
| 4,561,586 A | | 12/1985 | Abel et al. | |
| 4,696,096 A | * | 9/1987 | Green et al. | 29/829 |
| 4,899,920 A | * | 2/1990 | Abbagnaro et al. | 228/11 |
| 4,972,990 A | * | 11/1990 | Abbagnaro et al. | 228/20.1 |
| 5,081,739 A | * | 1/1992 | Kao | 15/341 |
| 5,553,766 A | | 9/1996 | Jackson et al. | |
| 5,620,132 A | | 4/1997 | Downing et al. | |
| 5,779,133 A | * | 7/1998 | Jackson et al. | 228/13 |
| 5,868,297 A | | 2/1999 | Zabel et al. | |
| 6,053,393 A | * | 4/2000 | Burke et al. | 228/119 |
| 6,131,794 A | * | 10/2000 | Burke et al. | 228/20.1 |
| 6,216,937 B1 | | 4/2001 | DeLaurentis et al. | |
| 6,360,938 B2 | * | 3/2002 | DeLaurentis et al. | 228/191 |
| 6,360,940 B1 | * | 3/2002 | Bolde et al. | 228/264 |
| 6,528,352 B1 | * | 3/2003 | Jackson et al. | 438/118 |

OTHER PUBLICATIONS

U.S. 2002/0088846A1 Bolde (Jul. 11, 2002).*

* cited by examiner

*Primary Examiner*—Kiley Stoner
(74) *Attorney, Agent, or Firm*—McGinn & Gibb, PLLC

(57) ABSTRACT

A method and structure for a chip detach apparatus and method that limits the solder ball maximum shear rate and, more particularly, that delays the application of shear force until a minimum predefined temperature is reached. The chip detach apparatus and method can be applied to chips with high solder ball counts, chips with small solder ball sizes, and chips with weak surface strength. The chip detach apparatus and method measures and accounts for variability in the electronic module manufacturing and assembly.

20 Claims, 3 Drawing Sheets

LOW STRAIN CHIP REMOVAL APPARATUS

BACKGROUND OF THE INVENTION

1. Field of the Invention

The present invention generally relates to the manufacture and test of electronic devices, and more particularly, to the removal of a chip from an electronic test module without damaging the chip or the attached solder balls.

2. Description of the Related Art

High performance chips (or dies) with increased logic complexity require advanced testing before they are assembled into final products. Further, the increased operating frequency of these advanced chips impose severe constraints to the electronic test processes and requires testing to be carried out under environmental conditions as close as possible to the conditions which the final product will endure in the field.

Conventional state of the art electronic testing uses temporary electronic packages that allow all of the input/output connectors to be simultaneously available for electronic testing. The need for simultaneous testing increases significantly as the number of advanced chips needed to assemble the final product increases.

The need to reduce production costs and continuously scale down chip features and scale up solder ball count and/or chip size has led to the use of electroplating processes as an efficient method to fabricate the chip solder balls needed for electrical interconnection to a temporary electronic test package. To avoid excessive chip (die) processing and handling during and after die testing, the chips must be separated from the temporary electronic testing package without damaging the die solder balls. Conventional separating processes use a spring loaded plunger which shears the chip from the module in a direction parallel to the chip surface to separate the die from the temporary electronic test package. To improve process repeatability, the spring force is adjusted each time with the help of a load gauge that uses a nominal sample size as dimensional reference.

However, if just one solder ball detaches at the wrong side (i.e., at the chip side) during separation, even without damaging the chip surface, the chip is deemed useless, i.e., because each damaged interconnect must be repaired and conventional repair processes are too time consuming, too expensive, and/or do not satisfy current quality control specifications.

Each conventional testing procedure comprises a module yield that reflects the percent of chips which are successfully detached (i.e., detached at the package side). Advanced chip testing requires 100% module yield. However, conventional separation techniques cannot consistently produce 100% module yield.

Conventional chip detach methods such as those disclosed in U.S. Pat. No. 5,553,766, entitled "In-situ Device Removal For Multi-chip Modules," and U.S. Pat. No. 6,216,937, entitled "Process And Apparatus To Remove Closely Spaced Chips On A Multi-chip Module," teach the use of bimetallic disk or memory device to pull the chip from a package once the assembly reaches solder softening point or, in other words, gripping and pulling the chip at different operating temperatures relative to the solder ball melting points. However, these detach techniques cannot guarantee that the solder balls will stay on the chip after chip detachment.

A conventional chip detach technique which offers more control (i.e., that the solder balls will say on the chip after chip detachment) involves shearing the chip from the package. To facilitate the solder ball separation at the package interface instead of at the chip interface, the temporary connection point in the package is built with smaller contact area than the solder ball base on the chip side. The temporary module is detached after electronic testing using a standard continuous belt furnace which heats the module and shearing hardware to a temperature near but not exceeding the solder ball melting point.

This process works well with packages with large solder balls and low solder ball count, such as packages with solder balls larger than 4.7 mil. in diameter and solder ball counts of less than 2000, mainly because the total force required to successfully shear the chip is low and the process window is large. The process window is the difference in the amount of force needed to separate each solder ball of a given chip at the package side from the amount of force needed to separate at least one solder ball from the chip side.

Unfortunately, this process is difficult to control when the chip has a large number of solder balls and/or with smaller size solder balls. A larger number of solder balls increases the total force needed to separate the chip with the consequent increase in the total force distribution range seen by the solder ball population in a given chip. Smaller solder balls reduce the solder ball base on the chip, thus reducing the range separating the shearing forces needed to shear the solder ball at the chip-package interface relative to the force needed to shear the solder ball at the chip interface. In addition, a larger number of solder balls also requires a larger die.

SUMMARY OF THE INVENTION

In view of the limitations of the conventional chip detach processes, the present invention provides a chip detach apparatus and method that limits the solder ball maximum shear rate and, more particularly, delays the application of shear force until a minimum predefined temperature is reached. In addition to being applicable to chips in general, the chip detach apparatus and method is specifically applicable to chips with high solder ball counts, chips with small solder ball sizes, and chips with weak surface strength. Furthermore, the chip detach apparatus and method measures and accounts for variability in the electronic module manufacturing and assembly.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
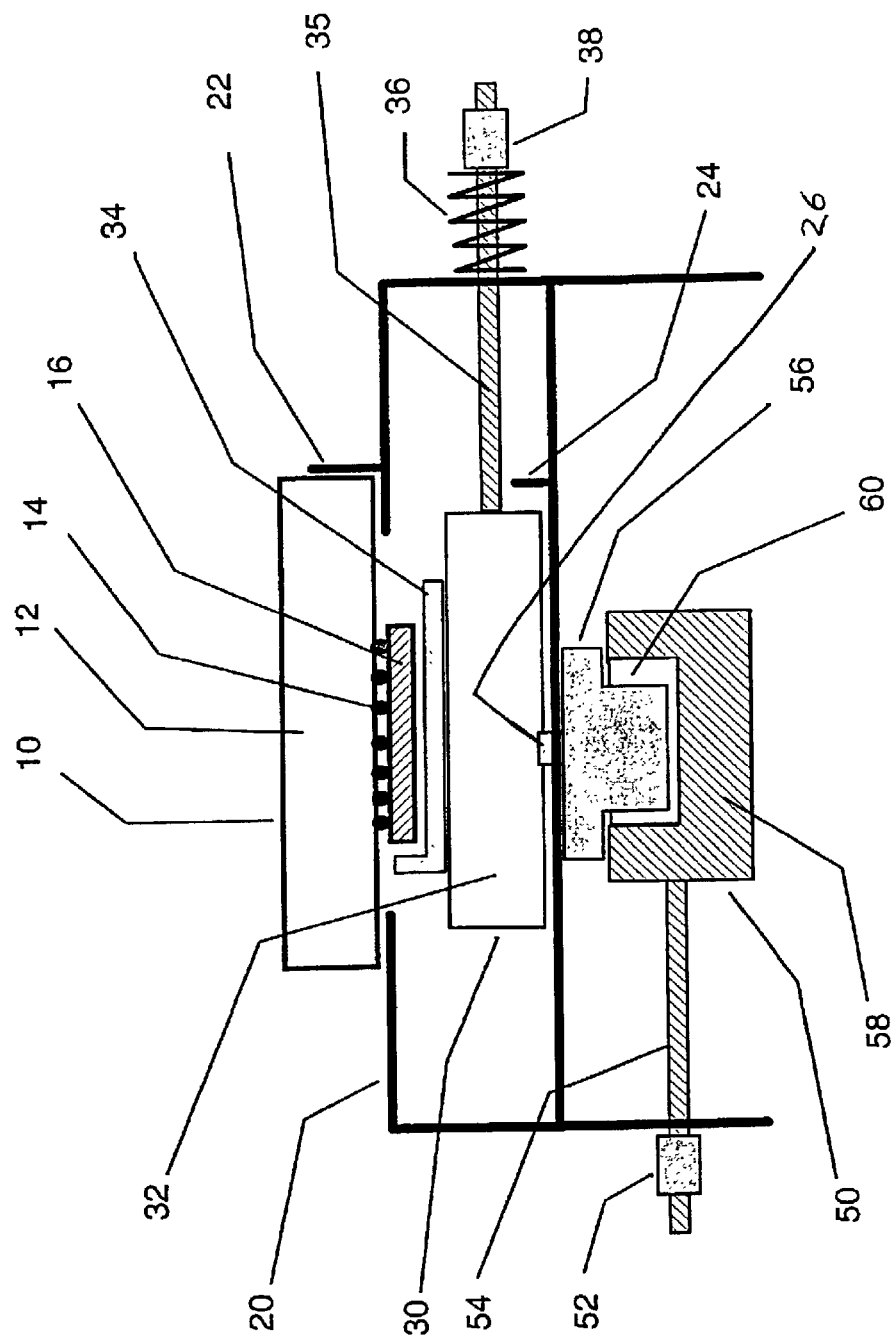
FIG. 1 is a schematic of an inventive chip detach apparatus.

Chip detachment occurs in two stages. Initially, as the electronic module is heated in conjunction with applied separation or shearing force, the weaker solder balls begin to separate while the remaining solder balls deform under an increasing shear force. The shearing force is distributed among the connectors, as the connectors separate, the force is then distributed among the remaining connectors.

Second, the increasing shear force reaches a critical point when the solder balls still attached to the electronic package can no longer support the shear load, and fail catastrophically under an increasing displacement velocity. Since the effective mechanical strength of solder increases as the shear rate increases, some of the remaining solder balls with the largest resistance and which are among the last to detach from the electronic package, fail to separate properly, i.e., create damage on the chip surface or separate on the chip side.

In addition, mechanical modeling demonstrates that the detach process yield is very sensitive to process dependent tolerances used during the assembly of the temporary electronic module, such as, for example, solder ball geometry variations found in the electronic module during the chip detach process. These geometric variations reduce the process window significantly. A small process window increases the chance that 100% module yield is not consistently attainable.

For example, the detach process forces were found to be sensitive to the solder ball base diameter, solder ball volume, and solder ball centrality offset relative to the direction of the ball shear force. While the first two parameters can be somewhat kept under control with tight process specifications, the last parameter is unavoidable as the difference in thermal expansion coefficient between the chip and the electronic package induce this radial displacement during the heating step in the processing furnace.

For example, an electronic package made from Alumina ceramic can induce a 12 microns offset on solder balls of a 20 mm chip when the module is heated to 150°. Since the chip detach process in this case is done around 250°, a larger centrality offset can be expected with an anticipated 40% reduction in process window.

Another variable not conventionally considered is module dimensional tolerances. Variations in the process to manufacture the temporary electronic module can add an uncertainty of 5 to 10 mils to the distance between the chip edge and the package edge. This uncertainty comes from three sources, namely, the electronic package size tolerance is typically 5–8 mils, the chip 16 size tolerance can add 0.5 to 1 mils to the total, and the centrality of the solder ball array interconnecting the chip to the package can add up to 2 mils. This uncertainty in conjunction with a large spring constant may increase the shear force variability between different electronic modules from an expected nominal 3% to an unacceptable 15%, with direct impact to production yields.

Furthermore, new chip manufacturing processes like SOI (silicon on insulator) and Silk (low dielectric constant insulation) reduce the chip surface strength. The reduction in chip surface strength results in a reduced process window.

The details of the current invention are best described with the help of the assembly schematic shown in FIG. 1, which includes: an electronic module 10 mounted on a metal carrier 20 engaged with a spring loaded device 30 coupled to a damper device 50. In an alternative embodiment, electronic module 10 may include, but is not limited to, a substrate, a micro-electronic carrier, an electronic card and/or an electronic board.

The electronic module 10 includes of an electronic package 12 and a chip 16 interconnected with an array of solder balls 14. In an alternative embodiment of the present invention, chip 16 can be any electronic component or device including, but not limited to a capacitor, an inductor, a conductor, and/or a resistor. In an alternative embodiment of the present invention, package 12 and chip 16 may be interconnected by or any combination of glass and/or attaching metals including, but not limited to dissimilar metals, bimetals, and/or trimetals, attaching compounds such as, but not limited to organic, inorganic, and/or polymeric compounds, thermally activated attachers, photosensitive attachers and/or ultraviolet sensitive attachers.

The electronic module 10 is mounted on metal carrier 20 against a stop wall 22 which prevents the electronic module 10 from moving laterally in the direction of stop wall 22. The shear force is applied to the chip 16 by engaging the chip 16 with the spring loaded device 30 which then pulls the electronic module 10 against the stop wall 22. The spring loaded device 30 comprises a chip pusher block 34 attached to a steel block 32, a load transfer rod 35, biasing device 36, tension adjust knob 38, and screw 26. In an alternative embodiment of the present invention, biasing device 36 comprises a spring.

Spring loaded device 30 receives a shearing force from the resulting displacement force generated by restricting or collapsing spring 36. Spring 36 is restricted by metal carrier 20 and tension adjust knob 38. In an alternative embodiment, shearing force can be generated by any device capable of generating displacement force to said spring loaded device 30, including, but not limited to, a thermally activated force device and/or pressure devices, such as, but not limited to gas and/or fluid.

In a preferred embodiment, screw 26 is not attached to metal carrier 20. The damper device 50 includes several elements, namely, a position adjust knob 52, damper position rod 54, damper reservoir 58, damper skate 56 and damper fluid 60. In a preferred embodiment, damper skate 56 is secured to steel block 32 with screw 26 or other equivalent securing means. The damper reservoir 58 position is fixed to the metal carrier 20 using the damper position rod 54. The damper device 50 position is fixed after mounting the electronic module 10 on the metal carrier 20 with the help of the position adjust knob 52. In an alternative embodiment of the present invention, the screw 26 is used to guide and/or limit the lateral and/or longitudal movement of steel block 32 and/or damper skate 56. In an alternative embodiment of the present invention, the metal carrier includes a guide that restricts the screw's lateral and/or longitudal movement.

Damper device 50 comprises a dampener which dampens the displacement force. In a preferred embodiment of the present invention, the dampener comprises a temperature activated body, wherein a change in temperature results in the temperature activated body directly or indirectly dampening the displacement force. In a preferred embodiment of the present invention, damper fluid 60 is the temperature activated body. In an alternative embodiment of the present invention the dampener comprises, but is not limited to photosensitive activated body, such as, but not limited to light and/or ultraviolet (UV) light. In another alternative embodiment of the present invention, damper device 50 comprises a pressure device.

In a preferred embodiment of the present invention, damper fluid 60 comprises solder. In an alternative embodiment of the present invention, damper fluid 60 comprises, but is not limited to, metal, bimetal, trimetal, dissimilar metals, compounds, such as, but not limited to glass, organic, inorganic, and/or polymeric.

After loading, the assembly is heated for example in an enclosed continuous furnace, such as, but not limited to a belt furnace or a batch furnace, where the chip 16 is detached from the electronic package 12 when the temperature of the assembly is high enough to soften the solder ball array 14. More specifically, the solder experiences a phase transformation as a result of the introduction of increased temperature. The solder goes from a solid state to a fluid state. In an alternative embodiment of the present invention, for example, if a polymeric compound is used to attach the chip 16 to the electronic package 12, the polymeric compound will transform from a controlled state to an amorphous state. The damper device 50 experiences a similar phase transformation.

During the chip detach process, the maximum movement of the spring loaded device 30 is limited by a stop wall 24, which engages the steel block 32 when the solder ball array 14 breaks free from the electronic package 12. Once the steel block 32 becomes mobile, its maximum speed is controlled by damper device 50. For example, the screw 26 and/or damper skate 56 may limit the spring loaded device 30 vertical displacement to less than 2 mils to minimize risk of damaging the solder ball array 14 during the chip detach event.

The damper skate 56 is free to move inside the damper reservoir 58 as the steel block 32 moves by displacing some of the damper fluid 60. However viscous forces generated by the displacement of the damper fluid 60 limit the change in the velocity of the damper skate 56. The magnitude of the viscous forces in the damper fluid 60 depend on the fluid type and the geometry of the space separating the damper skate 56 and the damper reservoir 58. Parameters of particular importance to the fluid displacement process are the fluid viscosity, the hydraulic diameter and surface area used to restrict the flow. To improve process control, the inventors have found advantageous to use a damper device 50, with particular work characteristics described above, which limits the speed of the metal block 32 to less than 1 mil/second.

The selection of damper fluid 60 should be made in conjunction with the design of both damper skate 56 and damper reservoir 58. The viscous force will be approximately proportional to the fluid viscosity, the surface area restricting the displacement of the damper fluid 60, and the hydraulic diameter for a small Reynolds number. For example, an electronic module with 3000 solder balls requires approximately 15 Newton of spring force to separate the chip from the package if the solder balls have a diameter of 3 mils. To limit the shear rate to less than 1 mil/second using a damper device with a 1 mil hydraulic diameter and a damper fluid, for example such as a polymer, with viscosity of 5000 Pascal-seconds above its softening point, then the damper flow area should be 30 square centimeters. This flow area can easily contained in a small volume by using an assembly of thin parallel plates.

The only restriction on the damper fluid 60 selection is to be compatible with the temperature range in the furnace used for chip detach. The viscous force magnitude should be designed to be of the same order of magnitude as the spring force setting. In this manner, the displacement of the steel block 32 will be limited to a maximum velocity set by the damper skate 56 equivalent terminal velocity, consequently limiting the maximum shear rate seen by the solder ball array 14 during the chip detach process.

A preferred embodiment of the present invention calibrates the chip detach apparatus. For example, to calibrate the chip detach apparatus, a test module with an adjustable load gauge is used. The load gauge is mounted on the metal carrier 20 in the same location where the electronic module 10 is later loaded, and the spring 36 tension is adjusted using the tension adjust knob 38. However, before adjusting the spring 36, the location of the load gauge must be adjusted, using the electronic module 10 as reference, to a position which will take into account the manufacturing tolerances of the electronic module 10. These two independent adjustment steps procedure should be applied to each electronic module loaded on said metal carrier. Then, the electronic module 10 can be loaded into the metal carrier 20 for further processing.

In an alternative embodiment of the present invention, the tool setup effort can be reduced significantly by using a restraining pin to hold the spring 36 in a preselected location while loading the electronic module 10 in conjunction with an adjustable stop wall 22. In this manner, the spring 36 must be tested only occasionally, just to verify that the force constant is not changing with use. Thus, the adjustable stop wall 22 provides means to compensate for dimensional tolerances of the electronic module 10.

In an alternative embodiment of the present invention, chip 16 is attached to package 12 by an attaching material. When heat and shear force are applied to the attaching material, the chip separates from the package. The temperature where the chip separates from the package and is referred to as the chip detach temperature and is preferably below the melting point of the attaching material. In an alternative embodiment of the present invention, the desired chip detach temperature is between ten and thirty percent lower than the melting point of the attaching material. By controlling the amount of heat and shear force applied to the attaching material, the separation, or shear rate, can be controlled. In an alternative embodiment, the damper device 50 is used to limit the shear rate and comprises a damper material that has melting characteristics that correspond to the chip detach temperature. For example, the damper material could begin to melt at a temperature ranging from plus or minus ten percent of the desired chip detach temperature. The damper material, while in a solid state, acts as a lock holding back the block 32. When the damper material begins to melt or change state it acts as a trigger and releases the shear force acting on the block 32 to the attaching material and/or chip. By choosing a material that begins to melt at a temperature that corresponds to the desired chip detach temperature, the chip can be removed without damage by the device removal apparatus by exposing the device removal apparatus to a constant heat.

For example, a preferred embodiment of the present invention uses the damper device 50 with a damper fluid 60 which is solid at room temperature. Of particular interest is the use of solder material as a damper fluid, where the melting temperature of the solder is selected to define the temperature for chip detach. For example, if the composition of the solder ball array is such that it melts at 300° C. and the desired chip detach temperature range is 240° C. to 250° C., then the composition of the damper fluid 60 should be selected to melt approximately at 240° C.

This embodiment does not require sophisticated setup procedure mainly because the position adjust knob 52 provides the same function as the use an adjustable stop wall 22. In addition, the spring 36 testing requirements are reduced significantly mainly because the only requirement is to apply a minimum force level which exceeds the force required to separate the chip 16 from the electronic package 12 at the temperature range of interest. This particular force will not be seen by the assembly because the chip separation will happen at a controlled shear rate during the force ramp-up step in the process furnace.

In a preferred embodiment of the present invention, the phase transformation of the solder 14 and the damper fluid 60 occurs simultaneously. In a preferred embodiment of the present invention, damper fluid 60 comprises solder. In an alternative embodiment of the present invention, the phase transformation of the attaching substance between chip 16 and the electronic package 12 and means utilized by the damper to dampen the displacement force occur at different times and/or at different rates.

Figure 2:
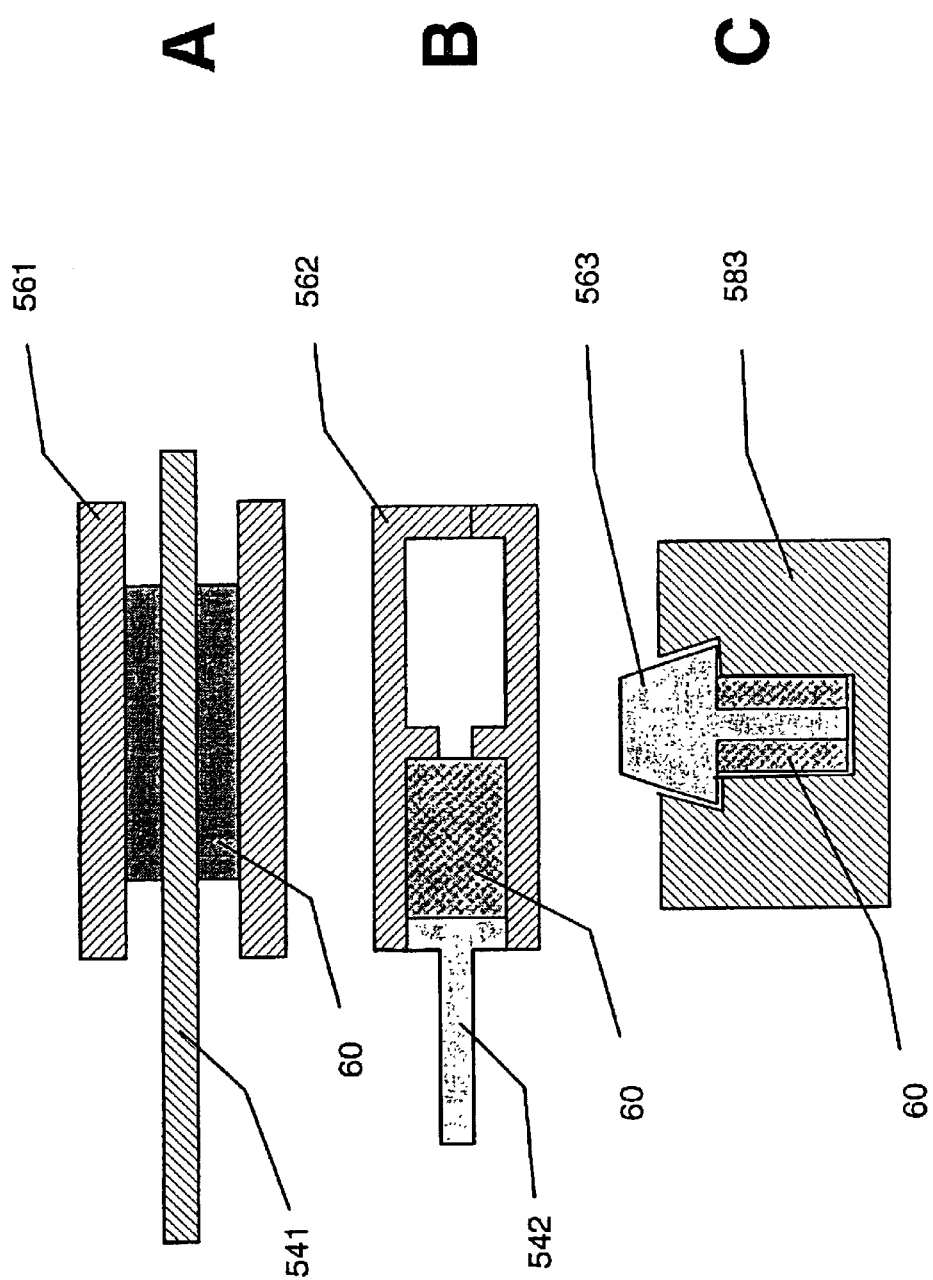
FIG. 2A illustrates an alternative embodiments of the inventive damper.
FIG. 2B illustrates an alternative embodiments of the inventive damper.
FIG. 2C illustrates an alternative embodiments of the inventive damper.

FIGS. 2A through 2C, illustrate alternative dampers. FIG. 2A illustrates a single use shock absorber type damper and includes a first plate 210 and a second plate 212, a center bar 214, and fluid 216. Block 32, as illustrated in FIG. 1, may attach to either the center bar 214, or either the first plate 210 or the second plate 212. FIG. 2B illustrates a single use piston type damper and includes a piston 212, a cylinder 222, and fluid 224. Block 32, as illustrated in FIG. 1, may attach to either the cylinder 222 or the piston 212. FIG. 2C illustrates a multi-use slide damper and includes a slide 230, a housing 232, and fluid 234. The slide 230 moves in and out of the housing 232. Block 32, as illustrated in FIG. 1, may attach to either the slide 230 or to the housing 232.

Figure 3:
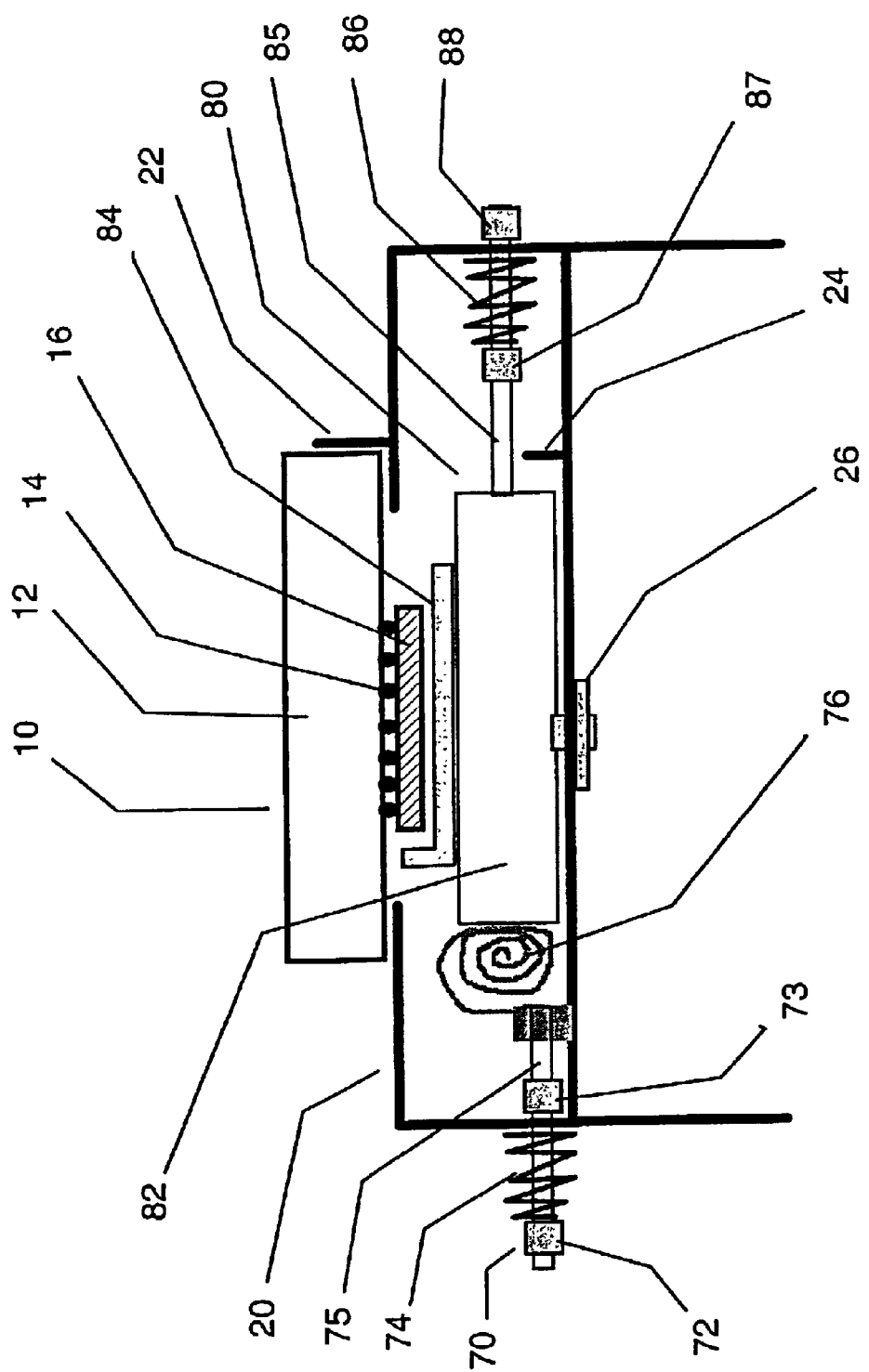
FIG. 3 illustrates an alternative embodiment of the inventive chip detach apparatus.

Another alternative embodiment of the present invention uses a thermally activated device to provide the shear force. One arrangement, shown in FIG. 3, is used here only for illustration purposes; however, it is understood that the same principles described below can be applied in many different shape forms without departing from this particular description. The term "thermally activated device" is used to describe the use of bimetallic plates and/or gas loaded containers like metal tubes which deform approximately linearly in a given dimension when the temperature increases. Shown in FIG. 3 are the electronic module 10, metal carrier 20 whose elements have already been described above, a chip pusher assembly 80, and a thermally activated device 70.

The chip pusher assembly 80 includes a guide rod 85, retention nuts 87 and 88, and a reset biasing device (e.g., spring) 86. In an alternative embodiment, reset biasing device 86 includes a spring. In this example, the chip pusher assembly 80 does not include means to develop and deliver shear force to the electronic module 10 since such function is performed by the thermally activated device 70. The function of the reset spring 86, a low tension convenience element, is to return the chip pusher assembly 80 to its initial loading position in the cooling section of the furnace.

The thermally activated device 70 includes a retention nut 72, biasing device 74, position adjust knob 73, positioning rod 75, and thermally activated element 76. In an alternative embodiment, biasing device 74 includes a spring. Depending on the initial tool setup, this embodiment can also provide the same two functions as the two previously described embodiments, namely, limit the maximum shear rate during chip detach and apply shear force at a preset temperature. The first process function is defined when selecting the thermo-mechanical characteristics of the thermally activated element 76 and by selecting an adequate heating ramp rate for the detach process. The second function is easily programmed into the thermally activated device with the use of the position adjust knob 73 during the sample setup step. Since the thermally activated element 76 expands near linearly with temperature, this element should be placed initially at an appropriate distance from the steel block 82 such that both elements will only become engaged at the desired temperature. Thus, the shear force generated by the expansion of the thermally activated element 76 will be transferred to the steel block only after the two elements come in contact. Tool calibration maximizes the process window when using this process and apparatus.

To reduce process variation due to geometric differences between different electronic modules, due to production tolerances, the preferred method to setup the metal carrier 20 with a thermally activated device 70 includes the following steps: loading the electronic module 10 on the metal carrier 20, placing a load gauge with predefined thickness between the electronic package 12 and the stop wall 22, and adjusting the position of the thermally activated device 70 using the position adjust knob 73 until the gauge shows a predetermined tension level. This procedure eliminates all electronic module geometric dependencies which can impact the chip detach process. The gauge thickness is then selected to determine the process temperature at which the thermally activated device 70 will engage the steel block 82 consequently beginning to shear the electronic module 10.

The present invention provides a chip detach apparatus and method that limits the solder ball maximum shear rate and, more particularly, delays the application of shear force until a minimum predefined temperature is reached. In addition to being applicable to chips in general, the chip detach apparatus and method is specifically applicable to chips with high solder ball counts, chips with small solder ball sizes, and chips with weak surface strength. Furthermore, the chip detach apparatus and method measures and accounts for variability in the electronic module manufacturing and assembly.

While the invention has been described in terms of preferred embodiments, those skilled in the art will recognize that the invention can be practiced with modification within the spirit and scope of the appended claims.

What is claimed is:

1. A device removal apparatus comprising:
   a first member adopted to contact a device to be removed from a substrate; and
   a damper comprising a damper reservoir maintaining damper material connected to said first member and being adapted to limit a shear rate of said first member.

2. The apparatus of claim 1, further comprising a biasing device connected to said first member and being adapted to deliver a shear force.

3. A device removal apparatus comprising:
   a first member adapted to contact a device to be removed from a substrate;
   a damper connected to said first member and being adapted to limit a shear rate of said first member; and
   a biasing device connected to said first member and being adapted to deliver a shear force,
   wherein said device is a test module, wherein said test module calibrates said shear force.

4. The apparatus of claim 1, wherein said device is a test module, wherein said test module calibrates said damper.

5. The apparatus of claim 1, wherein said device is a test module, wherein said test module calibrates said shear rate.

6. A device removal apparatus comprising:
   a first member adapted to contact a device to be removed from a substrate; and
   a damper connected to said first member and being adapted to limit a shear rate of said first member, wherein said damper comprises a temperature dependent material, such that said limit on said shear rate is temperature dependent.

7. The apparatus of claim 1, wherein said damper includes solder.

8. The apparatus of claim 1, wherein said damper prevents said first member from damaging said device by limiting said shear rate.

9. A device removal apparatus comprising:
   a first member adapted to contact a device to be removed from a substrate;
   a damper connected to said first member and being adapted to limit a shear rate of said first member, wherein said damper comprises:
   a damper skate connected to first member; and
   a damper reservoir maintaining damper material in which said damper skate is positioned.

10. The apparatus of claim 9, wherein when said damper material comprises a temperature dependant fluid.

11. A device removal apparatus comprising:
    a first member adapted to contact a device to be removed from a substrate;
    a thermally activated device connected to said first member and being adapted to move said first member; and
    a damper comprising a damper reservoir maintaining damper material connected to said first member and being adapted to limit a shear rate of said first member.

12. The apparatus of claim 11, wherein said thermally activated device includes bimetallic plates.

13. A device removal apparatus comprising:
    a first member adapted to contact a device to be removed from a substrate; and
    a thermally activated device connected to said first member and being adapted to move said first member,
    wherein said thermally activated device includes gas loaded containers.

14. The apparatus of claim 11, wherein said thermally activated device includes material that deforms linearly as temperature changes.

15. A device removal apparatus comprising:
    a first member adapted to contact a device to be removed from a substrate;
    a thermally activated device connected to said first member and being adapted to move said first member; and
    a biasing device connected to said first member, wherein said thermally activated device moves said first member in a first direction, and said biasing device is adapted to move said first member in a direction opposite said first direction.

16. The apparatus of claim 11, wherein said thermally activated device prevents said first member from damaging said device by limiting the movement of said first member.

17. A method for removing a device from a substrate comprising:
    applying a shear force to a first member adapted to remove said device from said substrate; and
    limiting said shear force by applying a damping force to said first member, wherein said damping force is applied through a damper reservoir maintaining damper material.

18. The method of claim 17, further comprising:
    calibrating said shear force by applying said shear force to a test device.

19. The method of claim 17, further comprising:
    calibrating said damping force by applying said shear force to a test device.

20. A method for removing a device from a substrate comprising:
    applying a shear force to a first member adapted to remove said device from said substrate; and
    limiting said shear force by applying a damping force to said first member,
    wherein said applying of said damping force comprises:
    connecting said first member to a damper skate; and
    positioning said damper skate in a damper reservoir, wherein said damper reservoir includes damper material.

* * * * *